(12) United States Patent
Amiel et al.

(10) Patent No.: US 8,838,025 B2
(45) Date of Patent: Sep. 16, 2014

(54) METHOD OF PROTECTING THE EXECUTION OF AN NFC APPLICATION LOADED IN A SECURE ELEMENT FORMING AN INTEGRAL PART OF A MOBILE TERMINAL

(75) Inventors: Patrice Amiel, Aix-les-Milles (FR);
Stephane Poujol, La Ciotat (FR);
Michel Martin, La Bouilladisse (FR);
Gil Bernabeu, Gemenos (FR)

(73) Assignee: Gemalto SA, Meudon (FR)

( * ) Notice: Subject to any disclaimer, the term of this patent is extended or adjusted under 35 U.S.C. 154(b) by 250 days.

(21) Appl. No.: 13/499,550

(22) PCT Filed: Sep. 29, 2010

(86) PCT No.: PCT/EP2010/064509
§ 371 (c)(1),
(2), (4) Date: May 30, 2012

(87) PCT Pub. No.: WO2011/039288
PCT Pub. Date: Apr. 7, 2011

(65) Prior Publication Data
US 2012/0231736 A1 Sep. 13, 2012

(30) Foreign Application Priority Data
Sep. 30, 2009 (EP) .................................... 09305920

(51) Int. Cl.
*H04B 5/00* (2006.01)
*H04M 1/00* (2006.01)
*H04B 1/38* (2006.01)
*H04L 29/06* (2006.01)
*H04W 12/06* (2009.01)
*G06Q 20/32* (2012.01)

(52) U.S. Cl.
CPC ........ *H04L 63/0853* (2013.01); *H04L 63/0492* (2013.01); *H04W 12/06* (2013.01); *G06Q 20/3278* (2013.01); *H06Q 20/3227* (2013.01)
USPC .......................................... 455/41.1; 455/558

(58) Field of Classification Search
USPC ............... 455/558, 410, 411, 557, 41.1, 41.2, 455/41.3; 235/379, 380, 382, 382.5
See application file for complete search history.

(56) References Cited

U.S. PATENT DOCUMENTS

2009/0065572 A1* 3/2009 Jain .............................. 235/379

FOREIGN PATENT DOCUMENTS

CN 101 291 494 A 10/2008

OTHER PUBLICATIONS

International Search Report (PCT/ISA/210) mailed on Dec. 23, 2010, by the European Patent Office as the International Searching Authority for International Application No. PCT/EP2010/064509.

(Continued)

*Primary Examiner* — Nguyen Vo
(74) *Attorney, Agent, or Firm* — Buchanan Ingersoll & Rooney PC

(57) ABSTRACT

The invention relates to a method for securing the execution of an onboard NFC application in a secure element which does not include a native OTA application. The secure element interacts with a mobile terminal including a removable card. According to the invention, the method includes recording an identifier of the removable card in the secure element no later than when the NFC application is loaded onto the secure element. When an event occurs, a verification is made, in the secure element, whether or not the identifier of the removable card present in the mobile terminal corresponds to the identifier previously stored in the secure element, in order to detect a possible change of the removable card.

10 Claims, 1 Drawing Sheet

(56) References Cited

OTHER PUBLICATIONS

Written Opinion (PCT/ISA/237) mailed on Dec. 23, 2010, by the European Patent Office as the International Searching Authority for International Application No. PCT/EP2010/064509.

M. Reveilhac et al., "Promising Secure Element Alternatives for NFC Technology", 2009 First International Workshop of Near Field Communication, Feb. 24, 2009, pp. 75-80.

* cited by examiner

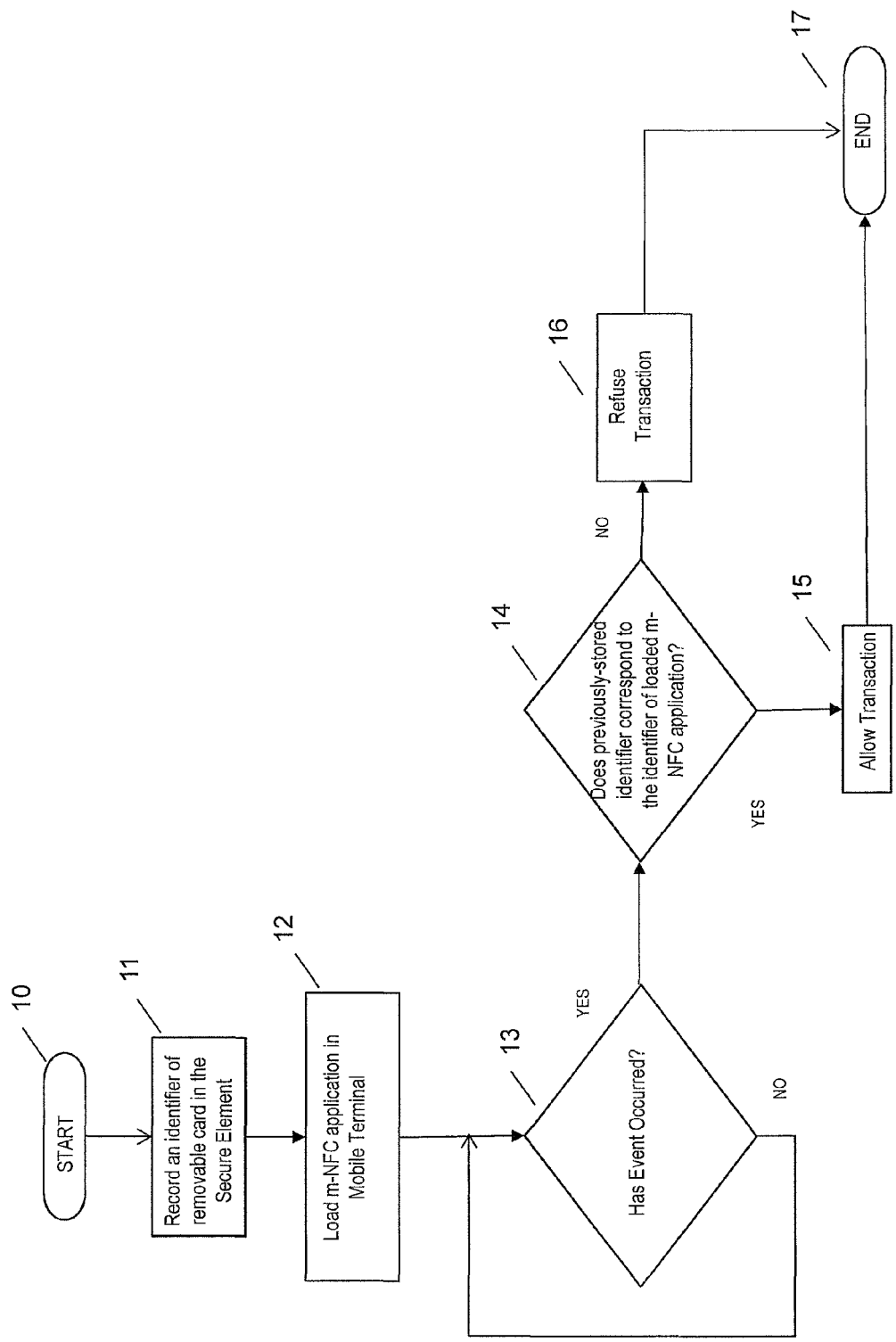

METHOD OF PROTECTING THE EXECUTION OF AN NFC APPLICATION LOADED IN A SECURE ELEMENT FORMING AN INTEGRAL PART OF A MOBILE TERMINAL

The field of the invention is that of telecommunication by mobile terminals and concerns more precisely a method of protecting the execution of an NFC (Near Field Communication) application loaded in a secure element forming an integral part of a mobile terminal.

An NFC application is software enabling an exchange of data between two entities distant by a few centimeters. This application for example enables a holder of a mobile terminal, of the GSM type for example, to make a transaction (a payment) at a merchant.

A mobile terminal conventionally comprises a secure element such as a removable SIM or USIM card allowing authentication with a telecommunication network.

If a subscriber wishes to be able to pay for goods via NFC or more generally use an NFC service using his mobile telephone, an ad hoc application must be installed in the (U)SIM card of his mobile terminal. This installation generally takes place via OTA, that is to say the operator, after having checked with the banking establishment of the subscriber or more generally with the provider of the NFC service that the subscriber is authorised to make such transactions (that he is not for example banned from banking), downloads via OTA an m-NFC application (m meaning that the NFC application is intended for a mobile terminal) in the (U)SIM card of the subscriber. Following this downloading, launching of the application enables the subscriber to make NFC transactions.

Each (U)SIM card is unique and in the ownership of the operator, who has a direct secure OTA communication capability with the card. In addition, it is not possible to duplicate a (U)SIM card. The operator therefore has certainty that the m-NFC application downloaded has indeed been downloaded onto the (U)SIM card of his subscriber and that the m-NFC service cannot be duplicated in an unauthorised fashion on another card of the same or another subscriber.

Recently mobile terminals have appeared integrating additional secure elements in a fixed or removable manner. These secure elements are multi-application cards that are soldered in the terminals (they are called ESEs—Embedded Secure Elements) or multi-application cards that can be inserted in/removed from the terminals (they are called SMCs—Secure Memory Cards).

An ESE or SMC does not have a "native" OTA capability and is not under the control of the operator of the network. Nevertheless, the operator can store data therein via OTA by relying on the communication mechanisms native to the mobile terminal, but these mechanisms do not use the (U)SIM cad. It is therefore possible for the MNO to install via OTA—in an ESE or an SMC—m-NFC applications similar to those installed in a (U)SIM. However, this installation is done through a communication channel that is not under the control of the operator, in a security element that does not belong to the operator, said element being contained in a terminal that is not controlled by the operator.

The problem in using an ESE is as follows: when the subscriber takes out an m-NFC subscription, the m-NFC application is downloaded via OTA into the ESE (rather than into the removable (U)SIM card). The terminal of the subscriber, referred to as terminal 1, then comprises the m-NFC application. The subscriber could then, in wishing to deceive his operator, insert his removable (U)SIM card in another terminal (referred to as terminal 2) also comprising an ESE and indicate to his operator that the m-NFC application is not functioning or that terminal 1 has a problem. The operator would then proceed with a new downloading of the m-NFC application, but this time into the ESE of terminal 2 containing the (U)SIM card of the subscriber. Because of this, the two terminals 1 and 2 would include the m-NFC application, which would thus have been duplicated, and the holder of terminal 2 could make m-NFC transactions without having been authorised for this by the operator.

Likewise, the problem with using an SMC is as follows: when the subscriber takes out an m-NFC subscription, the m-NFC application is downloaded by OTA into the SMC 1 of his terminal. The subscriber could then, in wishing to deceive his operator, insert another removable SMC card (referred to as SMC 2) in his terminal and request a new downloading into an SMC 2. Because of this, SMCs 1 and 2 will include the m-NFC application, which would thus have been duplicated.

In order to remedy these drawbacks, some operators have deployed servers responsible for detecting a duplication of services. By way of example, in the banking field, bank cards are listed in a blacklist as soon as they are declared lost or the validity thereof is exceeded. This blacklist is checked at each transaction.

The problem with this known solution is that it requires a large financial investment in order to interconnect not only all the NFC payment terminals of merchants to a central network, and that it requires carrying out checks in real time. This type of infrastructure is therefore not within the scope of service providers relating to ticketing (public transport), loyalty (supermarkets) or couponing (major brands) and is reserved for financially well off networks such as bank networks. This is because such service providers cannot finance the interconnection of all their NFC terminals to a central network, nor carry out checks in real time, The document CN 101291494 describes a method for matching a mobile terminal and a SIM card. The matching is done by an NFC chip included in the mobile terminal. When the mobile terminal is powered up, the NFC chip reads an identifier of the SIM card (for example the MCC, the MNC or the IMSI) and compares it with a previously stored identifier. If the identifiers are different (which means that the original SIM card has been replaced by a new SIM card), the power supply to the new SIM card is cut. The possibility of being removable is thus taken away and the mobile terminal is no longer operational for making or receiving calls.

On the other hand, the NFC application loaded in the NFC chip for its part remains operational, that is to say this chip can still be employed for making NFC transactions (the power supply thereto is not cut).

This document therefore does not describe a solution for protecting the execution of an NFC application loaded in a secure element.

This document also does not deal with protecting the execution of an NFC application loaded in a secure element. It profits from the existence of an NFC chip, which is a secure element for matching the terminal and card. This chip could just as well be a Bluetooth or other chip. The only function of the chip is to protect the mobile terminal and not the NFC part of the terminal.

The objective of the present invention is in particular to remedy these drawbacks.

More precisely, one of the objectives of the invention is to provide a method making it possible, in the case of the use of an ESE fixed to a mobile terminal or a removable MSC, to detect the use, by means of this terminal, of a service of the m-NFC type, when the user of this service is not the one who was previously authorised by his operator, who downloaded the m-NFC application via the OTS. In other words, the main objective of the invention is to propose a method for detecting an unauthorised duplication of an m-NFC service.

Another objective of the invention is to warn the operator who provided this service to a subscriber when there is such a fraudulent use of such an m-NFC service, so that he can take the appropriate steps.

These objectives, as well as others that will emerge subsequently, are achieved by means of a method of protecting the execution of an NFC application loaded in a secure element not comprising a native OTA application under the control of the operator, the secure element cooperating with a mobile terminal, the mobile terminal also comprising a removable card, this method consisting of:
- recording in the secure element an identifier of the removable (U)SIM card at the latest when the NFC application is loaded in the secure element;
- when an event occurs, checking in the secure element whether the identifier of the removable (U)SIM card present in the mobile terminal corresponds to the identifier previously stored in the secure element in order to detect any change of removable card.

In a first embodiment, the identifier is the ICCID of the removable (U)SIM card.

In a second embodiment, the identifier is the IMSI of the removable (U)SIM card.

In a third embodiment, the identifier is the MSISDN of the removable (U)SIM card.

Preferentially, the event triggering the comparison of the identifier stored in the secure element with that of the removable (U)SIM card is the occurrence of an NFC transaction.

In another embodiment, this event is a powering up of the mobile terminal.

Advantageously, the method according to the invention also consists of notifying to the issuer of the NSC application an indication of change of removable (U)SIM card if such a change has been detected.

This notification can be made via an OTA channel or via an NFC channel.

In a preferential embodiment, the method according to the invention consists of blocking the execution of the NFC application if a change of removable (U)SIM card is detected.

Advantageously, the method according to the invention consists of the blocking, by the issuer of the NFC application, of the execution of the NFC application via an OTA or NFC channel.

Other features and advantages of the invention will emerge from the following reading of an advantageous embodiment of the invention, given by way of illustration and non-limitatively, and the accompanying single FIGURE representing a preferential embodiment of the method according to the invention.

The context, as indicated previously, is a mobile terminal comprising firstly a removable card of the (U)SIM card type and secondly a secure element forming an integral part (soldered or not) of this mobile terminal. The secure element does not comprise a native OTA application, that is to say it is incapable of performing an operation of the OTA type (via the mobile terminal) when it is given to its end user. It also does not include an identifier of the MSISDN type and cannot therefore be contacted by the operator of the telecommunication network. This secure element cooperates with the mobile terminal (is included therein, fixedly or detachably), the latter also comprising a removable card.

The accompanying single FIGURE shows a preferential embodiment of the method according to the invention.

In this FIGURE, step 10 corresponds to a starting step.

Step 11 consists of recording in the secure element an identifier of the removable card at the latest when the NFC application is loaded in the secure element. This identifier is a unique identifier of the removable card, that is to say each card has its own identifier and the identifier of each card is unique.

The recording can take place when the mobile terminal comprising the removable card and the secure element integrated in the mobile terminal is first powered up. The secure element is thereby associated with the removable card, definitively.

The recording of the identifier is carried out by means of a communication channel established between the removable card and the secure element.

In a first embodiment, the identifier is the ICCID of the removable card.

In a second embodiment, the identifier is the IMSI of the removable card.

In a third embodiment, the identifier is the MSISDN of the removable card.

This recording of the identifier is carried out in a secure manner so that, once recorded, the identifier can no longer be modified.

It is also possible to perform this recording when the m-NFC application is loaded in the mobile terminal, the essential thing being that the identifier be recorded before the end of the loading of the m-NFC application in the mobile terminal.

At step 12, the m-NFC application is definitively loaded in the mobile terminal and is ready to be executed.

At step 13, it is checked whether an event (which will be described subsequently) occurs. If it occurs, step 14 is passed to, which consists of checking in the secure element whether the identifier of the removable card present in the mobile terminal corresponds to the identifier previously stored in the secure element in order to detect any change of the removable card.

If the identifier stored corresponds to that of the removable card present in the mobile terminal, this means that there has been no change of removable card in the terminal: the subscriber who requested the m-NFC service is therefore indeed the one who is authorised by the operator to download the m-NFC application. In this case, an NFC transaction can take place at step 15.

In the contrary case, that is to say if the identifier stored does not correspond to that of the removable card present in the mobile terminal, this means that there has been a change of removable card in the terminal: the subscriber who requested the m-NFC service is therefore not the one who is authorised by the operator to download the m-NFC application. In this case, execution of the NFC transaction is refused at a step 16.

Steps 15 and 16 are followed by an end step 17.

The event checked during step 13 is typically the occurrence of an NFC transaction: the user attempts to make such a transaction in order to pay for a good or service or identifies himself with a reader in order to purchase a public transport ticket, benefit from a discount on a product or present his loyalty card.

This event can also consist of a powering up of the mobile terminal.

If at the end of these events it is detected that the identifiers are not identical, step 16 can also consist of notifying to the issuer of the NFC application an indication of change of removable card. This notification can take place on an OTA channel (in the event of verification of the identifier on powering up) or by the NFC channel (in the case of verification of the identifier during an NFC transaction).

During step 16, it may also be envisaged automatically blocking execution of the NFC application.

It may also be envisaged, in the case where the terminal informs the issuer of the NFC application of a change of removable card, that this issuer may block the execution of the NFC application via an OTA or NFC channel.

The method of the invention makes it possible for example, in the case of detection of change of removable card in the terminal containing the ESE or SMC, to block an NFC transaction and to inform the issuer of the NFC application, who is not in principle the operator but an establishment of the Eurocard, Mastercard or VISA (protected trade marks) type of a change of removable card in the mobile terminal previously authorised to make such transactions, for example on the occurrence of a new attempt at an NFC transaction.

The above description has been given simply by way of illustration and non-limitatively and a person skilled in the art will easily imagine other embodiments of the present invention coming within the scope of the claims.

The invention claimed is:

1. A method of protecting the execution of an NFC application loaded in a secure element not comprising a native OTA application, said secure element cooperating with a mobile terminal, said mobile terminal also comprising a removable card, comprising:

recording in said secure element an identifier of said removable card no later than when said NFC application is loaded in said secure element;

when an event occurs, checking in said secure element whether the identifier of the removable card currently present in said mobile terminal corresponds to the identifier previously stored in said secure element, in order to detect any change of removable card; and blocking the execution of said NFC application if a change of removable card is detected.

2. The method according to claim 1, wherein the identifier is the ICCID of said removable card.

3. The method according to claim 1, wherein the identifier is the IMSI of said removable card.

4. The method according to claim 1, wherein the identifier is the MSISDN of said removable card.

5. The method according to claim 1, wherein the event is the occurrence of an NFC transaction.

6. The method according to claim 1, wherein the event is a powering up of said mobile terminal.

7. The method according to claim 1, further comprising notifying the issuer of said NFC application an indication of change of removable card if such a change has been detected.

8. The method according to claim 7, wherein the notification is made via an OTA channel.

9. The method according to claim 8, further comprising blocking, by the issuer of said NFC application, the execution of said NFC application via an OTA or NFC channel.

10. The method according to claim 7, wherein the notification is made via an NFC channel.

* * * * *